April 26, 1927.
W. N. BOOTH
VEHICLE WHEEL
Filed April 30, 1917
1,625,879
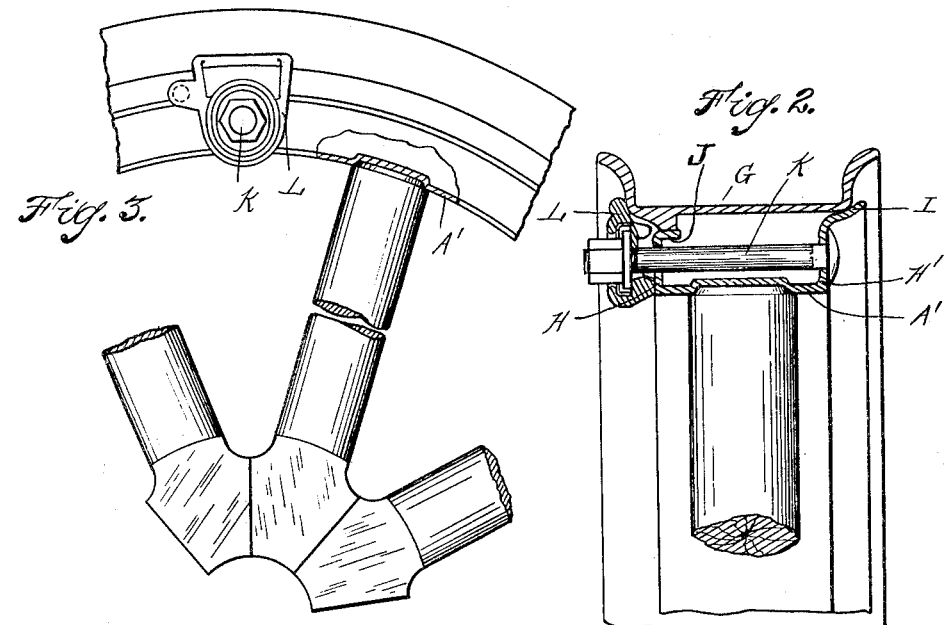
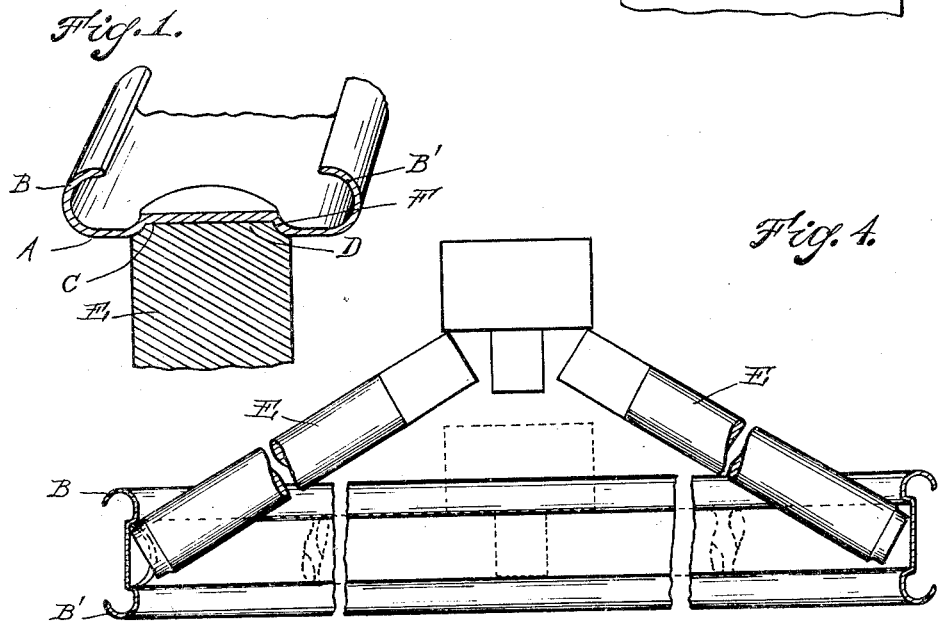
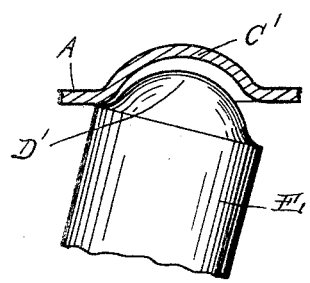
Inventor
William N. Booth.
By Whittemore Hulbert & Whittemore
Attorneys Patented Apr. 26, 1927.

1,625,879

UNITED STATES PATENT OFFICE.

WILLIAM N. BOOTH, OF DETROIT, MICHIGAN.

VEHICLE WHEEL.

Application filed April 30, 1917. Serial No. 165,383.

The invention relates to vehicle wheels of the wooden spoke type, and it is the object of the invention to avoid certain objections incident to the use of a wooden felly. To this end the invention comprises the novel construction and combination of a metallic felly and wooden spokes, and the method of assembling the structure as hereinafter set forth.

In the drawings:

Figure 1 is a cross-section of a wheel embodying my improvement, and provided with a combined metallic felly and clincher rim;

Figure 2 is a similar view, showing the metallic felly and demountable rim;

Figure 3 is an elevation of the construction shown in Figure 2;

Figure 4 illustrates the manner of assembling the spokes and rim;

Figure 5 is a section showing a modified construction.

In the present state of the art it is usual to provide wooden spoked wheels with wooden fellies which are bored radially to receive tenons on the outer ends of the spokes. It is a difficult matter to accurately form wooden fellies and to maintain them in true circular form when once made. Consequently in the manufacture of wooden wheels there is considerable waste in structures rejected for lack of accuracy. On the other hand, metallic rims and fellies are easily fashioned with a high degree of accuracy and uniformity, but are not adapted for assembling with spokes by the usual method in the manufacture of wooden wheels. This is for the reason that the wooden fellies are formed in half sections, permitting of the engagement of the spoke tenons with the radial bores of the separate sections and then assembling and tightening by radial compression before engagement with the metallic rim. It is not desirable to form a metallic felly in sections, and with a single annulus the spokes cannot be engaged by radial movement without interference with each other. I have therefore devised a construction in which a single metallic annulus, forming the felly, is provided with comparatively shallow spoke tenon-engaging recesses, the spokes being engaged therewith while out of radial alignment and then forced laterally into alignment.

As shown in Figure 1, A is the felly which is provided with the opposite side flanges B and B' for engagement with a clincher tire. At suitable intervals the web portion of the annulus is outwardly embossed to form on its inner side shallow recesses C. These are adapted to receive corresponding tenons D on the ends of the spokes E, said tenons being preferably of lesser diameter than the body portion of the spoke so as to leave shoulders F for fitting against the portion of the rim surrounding the recesses C. To assemble the spokes and felly, the former are first arranged in oblique relation to the plane of the wheel, their outer tenoned ends being inserted in the recesses C and their inner or hub ends being in contact with each other. Pressure is then applied laterally to the hub ends to force them into the plane of the wheel, as indicated in Figure 4, and this movement also forces the tenon ends radially outward so as to abut the same firmly against the inner faces of the recesses C.

In the construction shown in Figures 2 and 3 the felly A' forms a seat for a demountable rim G, and is formed with the parallel outwardly-extending flanges H and H', one of which terminates in the flaring flange I. The other flange is provided with an inwardly-extending cylindrical flange J, which together with the flange I forms a seat for the demountable rim G. Bolts K extend through the felly and are used for engaging wedges or clamps L which secure the demountable rim to the felly.

With the construction as described, the felly, being formed by dies, is round and true to a high degree of accuracy, and if the spokes are formed of uniform length they will bear with equal pressure in each of the sockets C. These sockets have sufficient depth to preclude possibility of disengagement and at the same time the depth is not too great to prevent engagement of the spokes by the method above described.

With the modified construction shown in Figure 5 the felly is provided with recesses C' of a rounded or substantially hemispherical form, and the tenons D' on the ends of the spokes are correspondingly fashioned. This will facilitate the assembly of the spokes with the felly, as the rounded form of the tenons will permit the same to more readily rock into engagement with the recesses.

What I claim as my invention is:

The new article of manufacture comprising a semiwood wheel for motor vehicles and composed of a body of wooden spokes radiating from a common center and each having an integral shaped outer end, in combination with a wrought metal endless fixed rim which presents a demountable-rim-supporting raised back flange, said fixed rim having at points below said back flange as many pressed-out, closed, concave sockets as there are spoke ends, said sockets fitting the shaped ends of respective wooden spokes and sealing the end-grain thereof, and said rim being circumferentially tensioned upon and holding under compression the body of spokes, as a whole.

In testimony whereof I affix my signature.

WILLIAM N. BOOTH.